(12) United States Patent
Jung et al.

(10) Patent No.: US 12,139,850 B2
(45) Date of Patent: Nov. 12, 2024

(54) ROPE FOR TRAWL NETS WITH HIGH-STRENGTH EYE-SPLICE

(71) Applicants: Samyoung Jung, Busan (KR); Dahyun Jung, Busan (KR)

(72) Inventors: Samyoung Jung, Busan (KR); Dahyun Jung, Busan (KR)

(*) Notice: Subject to any disclaimer, the term of this patent is extended or adjusted under 35 U.S.C. 154(b) by 0 days.

(21) Appl. No.: 18/183,449

(22) Filed: Mar. 14, 2023

(65) Prior Publication Data
US 2024/0032520 A1 Feb. 1, 2024

(30) Foreign Application Priority Data
Jul. 29, 2022 (KR) .................. 10-2022-0094309

(51) Int. Cl.
| | | |
|---|---|---|
| *D07B 1/18* | (2006.01) | |
| *A01K 73/02* | (2006.01) | |
| *A01K 75/00* | (2006.01) | |
| *D07B 1/02* | (2006.01) | |
| *D07B 1/16* | (2006.01) | |
| *D07B 9/00* | (2006.01) | |

(52) U.S. Cl.
CPC .............. *D07B 1/185* (2013.01); *A01K 73/02* (2013.01); *A01K 75/005* (2022.02); *D07B 1/025* (2013.01); *D07B 1/162* (2013.01); *D07B 1/18* (2013.01); *D07B 9/00* (2013.01); *D07B 2201/20903* (2015.07); *D07B 2205/201* (2013.01); *D07B 2501/2038* (2013.01)

(58) Field of Classification Search
CPC . D07B 1/16; D07B 1/18; D07B 1/185; D07B 2201/209; D07B 2201/20903; F16G 11/146; A01K 73/005; A01K 73/02

USPC .............................................. 57/22, 23, 202
See application file for complete search history.

(56) References Cited

U.S. PATENT DOCUMENTS

| | | | | |
|---|---|---|---|---|
| 1,703,269 | A * | 2/1929 | McClintock | D07B 1/18 87/8 |
| 1,994,674 | A * | 3/1935 | Inwagen, Jr. | F16G 11/03 294/86.42 |
| 2,463,199 | A * | 3/1949 | Peterson | F16G 11/02 57/202 |
| 3,367,102 | A * | 2/1968 | Meger | D07B 1/18 57/22 |

(Continued)

FOREIGN PATENT DOCUMENTS

| | | |
|---|---|---|
| CN | 211848611 U | 11/2020 |
| JP | 3031483 U | 11/1996 |

(Continued)

*Primary Examiner* — Shaun R Hurley
(74) *Attorney, Agent, or Firm* — You & IP, LLC

(57) ABSTRACT

A rope for trawl nets having a high-strength eye-splice comprises an eye portion made of an HMPE material and tied round the end of the rope; a first fixing member preventing the eye portion from unraveling; an HMPE splice portion formed in a splice manner and having an outside and an inside that comprise HMPE, respectively; an HMPE sheathed strand portion in which a basic rope is interpolated inside, and strands of an HMPE material are woven in a blade manner on the outside of the basic rope; a second fixing member located at the end of the HMPE sheathed strand portion and capable of fixing the HMPE sheathed strand portion so that it does not come loose; and a basic rope portion comprising a general PE material.

3 Claims, 7 Drawing Sheets

(56) References Cited

U.S. PATENT DOCUMENTS

| | | | | |
|---|---|---|---|---|
| 4,036,101 A | * | 7/1977 | Burnett | F16G 11/14 |
| | | | | 87/8 |
| 4,058,049 A | * | 11/1977 | Bech | F16G 11/146 |
| | | | | 87/8 |
| 4,225,172 A | * | 9/1980 | Marquardt | F16G 11/03 |
| | | | | 294/86.42 |
| 7,399,018 B1 | * | 7/2008 | Khachaturian | D07B 1/185 |
| | | | | 294/74 |
| 2018/0119341 A1 | * | 5/2018 | Worswick | B66D 1/34 |

FOREIGN PATENT DOCUMENTS

| | | |
|---|---|---|
| JP | 2019-513916 A | 5/2019 |
| KR | 10-1798454 B1 | 11/2017 |

\* cited by examiner

ROPE FOR TRAWL NETS WITH HIGH-STRENGTH EYE-SPLICE

TECHNICAL FIELD

The present invention relates to a rope for trawl nets having a high-strength eye-splice and, more specifically, to a rope for trawl nets comprising an eye portion and a splice portion made of an HMPE material, a high-modulus polyethylene (HMPE) sheathed strand portion, and a high-strength ice splice that may be fixed with a first fixing member and a second fixing member.

BACKGROUND ART

A dragged net, one of fishing nets, is used to catch a large amount of fish by horizontally dragging the net having wings on both sides of the handle, and is generally applied to trawl fishery and used as a trawl net.

Such a trawl net is used by being coupled to a ship that moves on water and comprises a draw line for applying a fishing gear from the ship into target water, an otter board for deploying the fishing gear, a sweep line for inducing fish, a bag net connected to the sweep line and has a lattice shape, and an end stalk placed at the end of the bag net and used to actually catch the fish induced into the bag net.

In general, the operation method using a trawl net is a method in which the trawl net is released from a netting machine at the place where various fish groups are formed, and the trawl net is cast toward the fish groups, thereby capturing fish into the inside of the trawl net and collecting them at the rear end of the trawl net.

All meshes of a trawl net have squares or rhombuses and woven in a manner that the meshes become smaller toward the rear. A pair of otter boards are used to catch more fish groups by widening the ends of the net left and right and up and down. That is, the otter boards are connected to a warp extending from a fishing boat and are spread left and right in the course of the fishing boat, and the trawl net connected to the otter boards by a hand rope and a net pendant is spread left and right together with the otter boards such that the ends of the net may be extended left and right. In addition, a float that generates buoyancy is installed on the upper side of the net to expand the ends of the trawl net up and down, and a sinker having sedimentation power is installed on the bottom net on the lower side such that the float device floats and the sinker sinks in the process of casting the net, thereby expanding the net of the trawl net up and down.

Conventional ropes forming a trawl net have a problem in that, when the ropes are used to perform operating, tension is generated in the rope and a lot of breakage occurs in the eye-splice on which stress is concentrated.

Therefore, there is a need for a rope for a trawl net capable of increasing breaking strength and reducing the weight and volume of the trawl net.

Prior Art Citations

Korean Patent No. 10-1798454 (Issue Date: Nov. 16, 2017)

SUMMARY OF INVENTION

Technical Problem

The present invention has been devised to solve the above-identified problem and aims to provide a rope for trawl nets having a high-strength eye-splice, wherein an eye portion and a splice portion constituting the eye-splice are made of an HMPE material having a high strength and a low volume and weight, and the eye-splice may be fixed with a first fixing member and a second fixing member.

Solution to Problem

The rope for trawl nets having a high-strength eye-splice according to the present invention devised to achieve the above-identified object is made of an HMPE material and comprises: an eye portion that is tied round the end of the rope; a first fixing member preventing the eye-splice from unraveling; an HMPE splice portion formed in a splice manner and having an outside and an inside that comprise HMPE, respectively; an HMPE sheathed strand portion in which a basic rope is interpolated inside, and strands of an HMPE material are woven in a blade manner on the outside of the basic rope; a second fixing member located at the end of the HMPE sheathed strand portion and capable of fixing the HMPE sheathed strand portion so that it does not come loose; and a basic rope portion comprising a general polyethylene (PE) material.

In addition, the first fixing member is bent from a circle in an inward direction, which is the rope direction, so as to be in close contact with the rope and comprises a plurality of bent portions bent in an inward direction at the same interval.

In addition, the second fixing member is bent from a circle in an inward direction, which is the rope direction, so as to be in close contact with the rope and comprises a plurality of bent portions bent in an inward direction at the same interval.

Advantageous Effects of Invention

The present invention produces the effects of increasing the strength of the eye-splice of a rope constituting a trawl net, reducing the volume and weight of the net to reduce the operating time using the trawl net, and reducing the oil cost of the ship.

MODE FOR INVENTION

Figure 1:
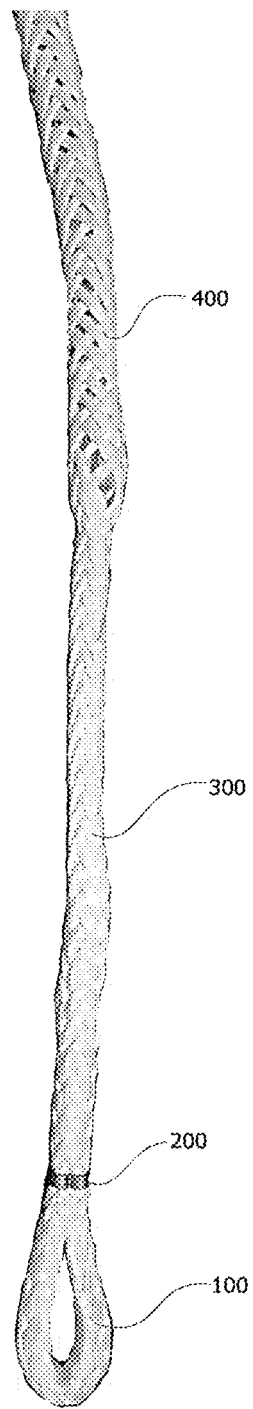
FIG. 1 is a diagram showing from the eye portion to the HMPE sheathed strand portion of a rope for trawl nets having a high-strength eye-splice according to a preferred embodiment of the present invention.

Hereinafter, a preferred embodiment of the present invention will be described in detail with reference to the drawings as attached. First of all, with regard to the reference numerals added to the components of each drawing, it should be noted that components which are the same have a single numeral as possible, even if displayed in different drawings. In addition, if it is determined that the specific description of a relevant feature or function conventionally known in the art may blur the gist of the present invention, such description is omitted. In addition, although a preferred embodiment of the present invention will be described below, the technical ideas of the present invention are not limited thereto and may be transformed to be practiced by a person skilled in the art.

Figure 2:
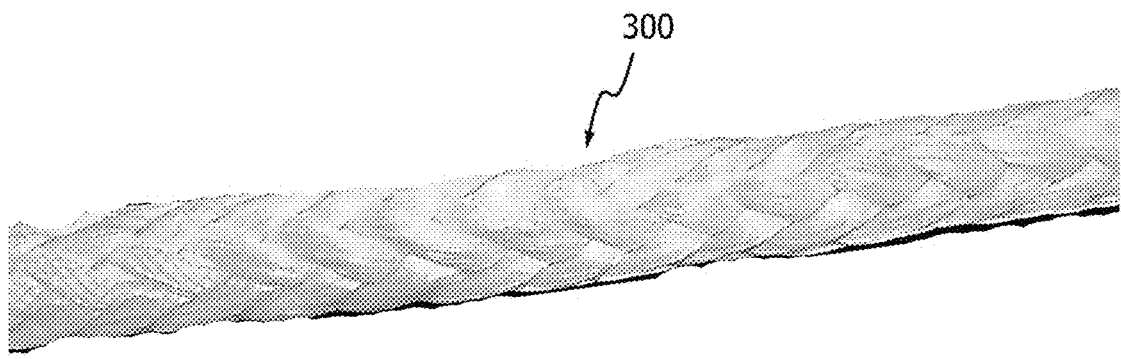
FIG. 2 is a diagram showing the HMPE splice portion.
Figure 3:
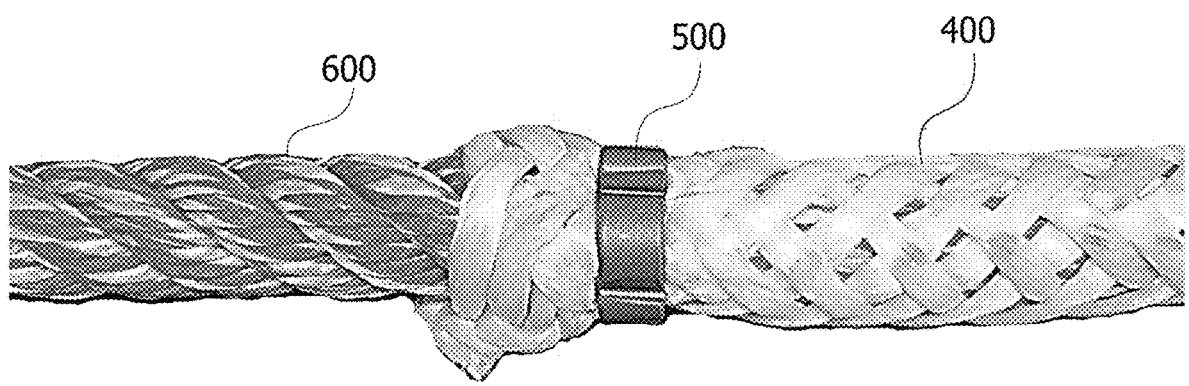
FIG. 3 is a diagram showing the second fixing member provided at the boundary between the HMPE sheathed strand portion and basic rope portion.
Figure 4:
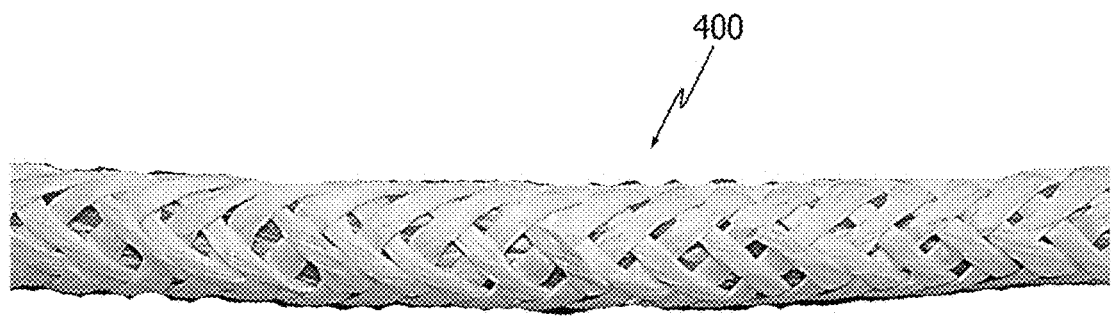
FIG. 4 is a diagram showing the HMPE sheathed strand portion.
Figure 5:
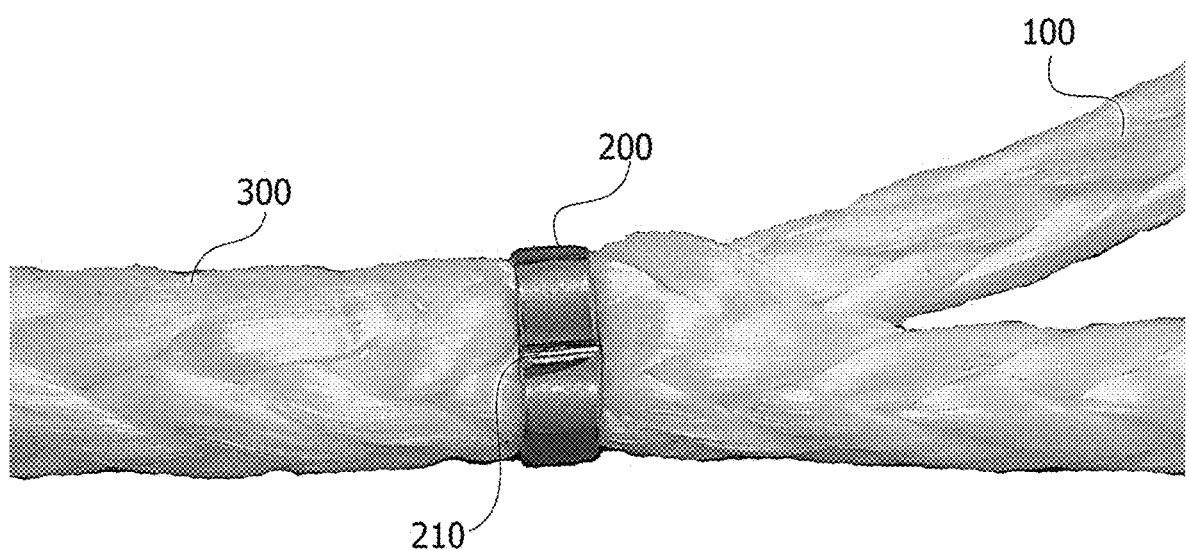
FIG. 5 is a diagram showing the first fixing member provided at the boundary between the eye portion and HMPE splice portion.
Figure 6:
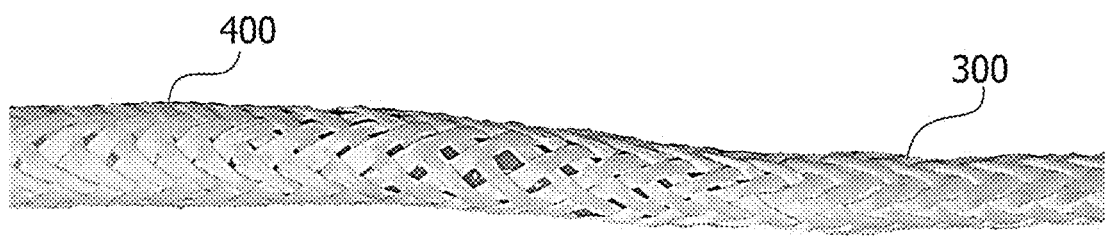
FIG. 6 is a diagram showing the HMPE splice portion and HMPE sheathed strand portion.
Figure 7:
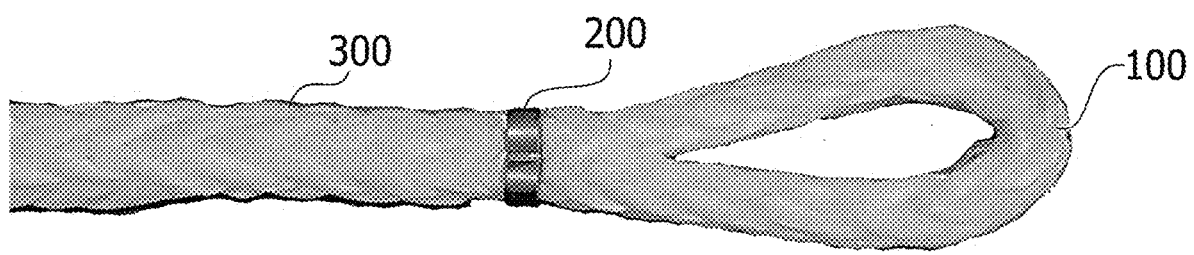
FIG. 7 is a diagram showing the eye portion, first fixing member and HMPE splice portion.
Figure 8:
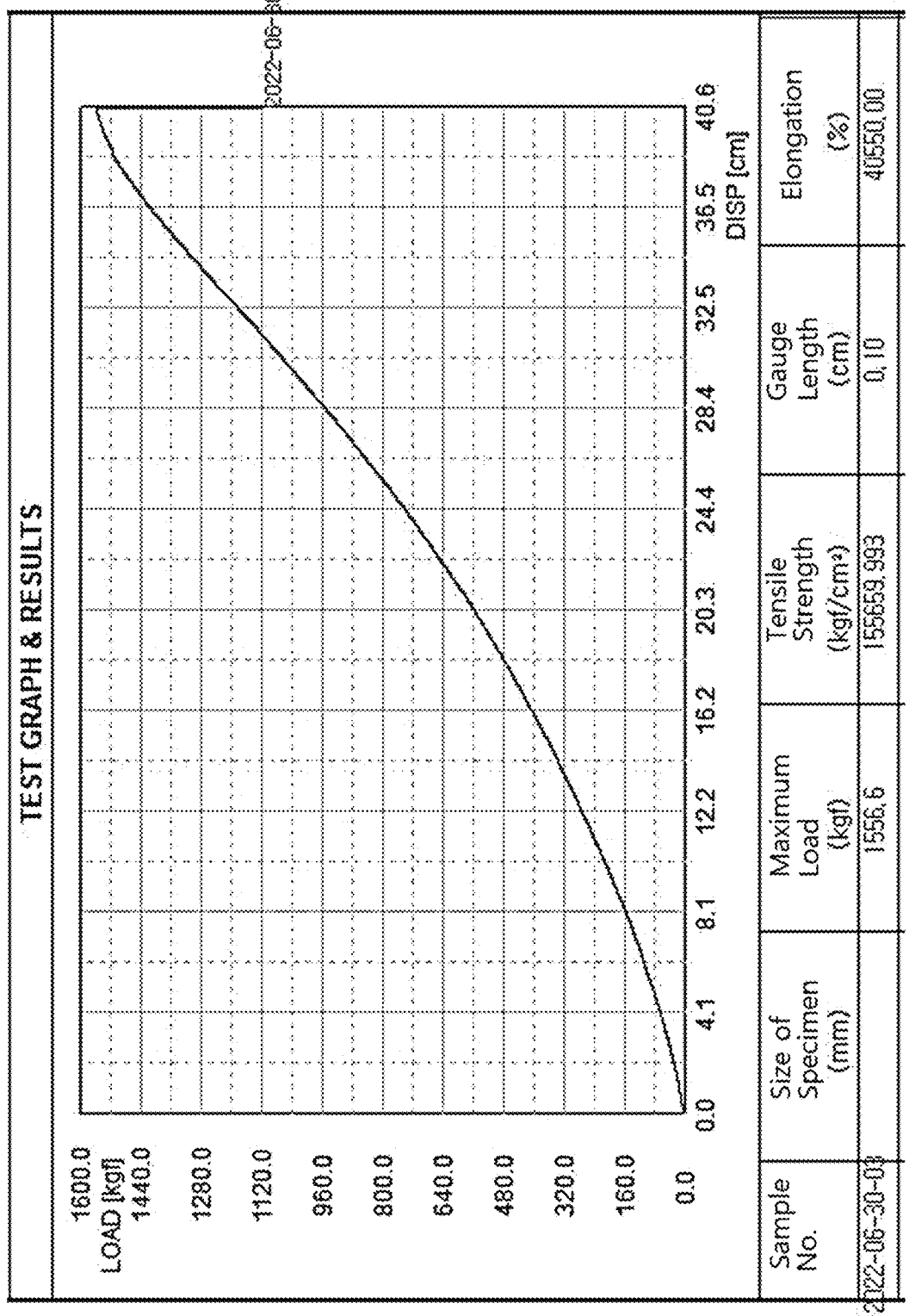
FIG. 8 is a graph and a chart showing test results on the strength of the conventional rope for trawl nets.
Figure 9:
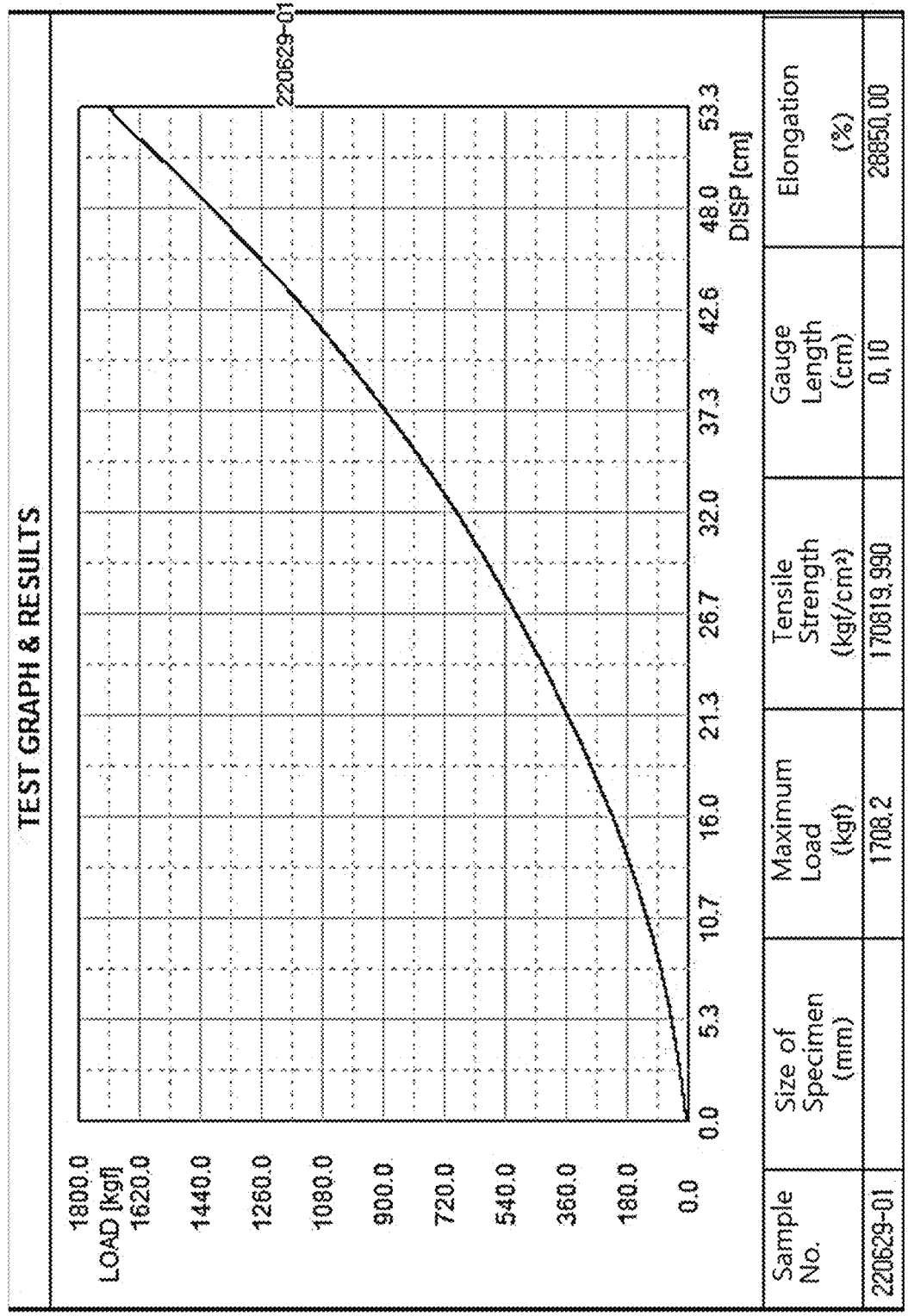
FIG. 9 is a graph and a chart showing test results on the strength of the rope for trawl nets having a high-strength eye-splice according to a preferred embodiment of the present invention.
Figure 10:
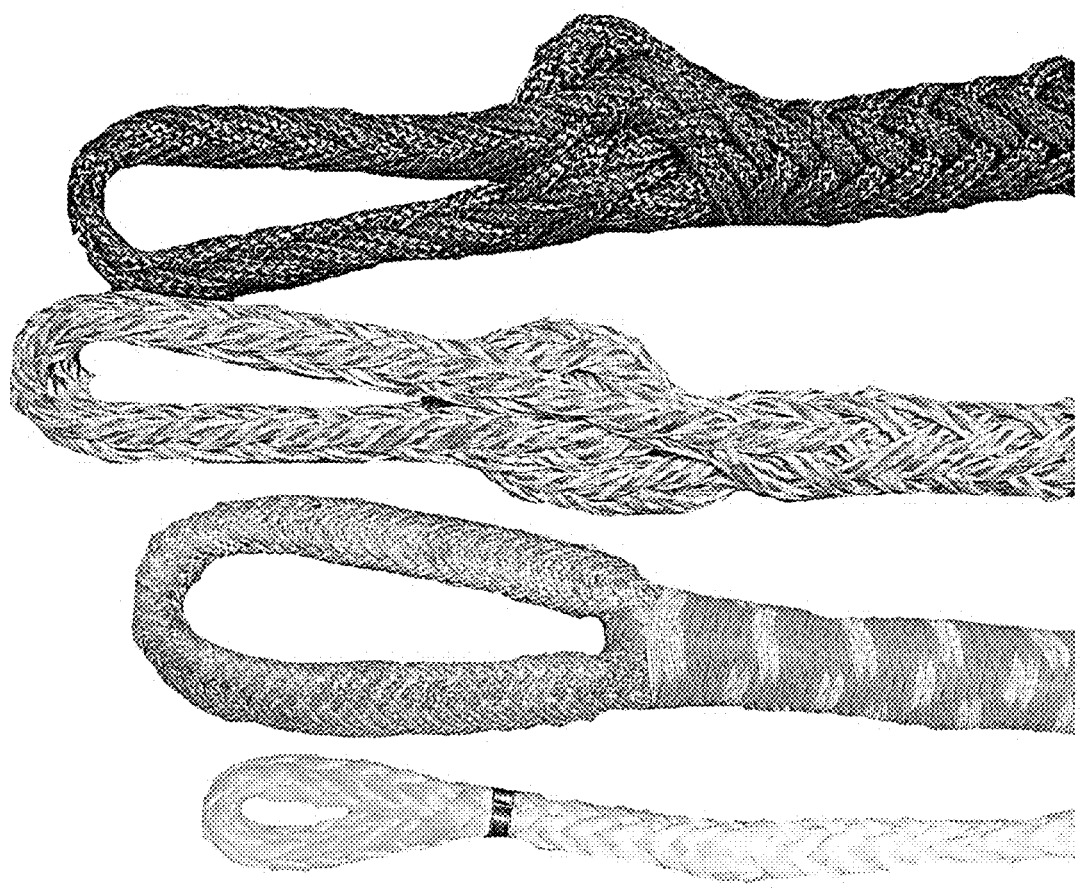
FIG. 10 is a photograph comparing the thickness of a conventional rope for trawl nets with that of the rope for trawl nets having a high-strength eye-splice according to a preferred embodiment of the present invention.
Figure 11:
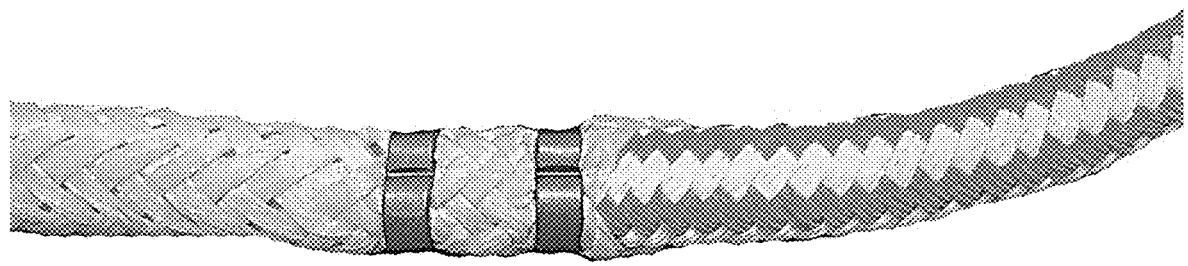
FIG. 11 is a diagram showing a rope having two second fixing members.

FIG. 1 is a diagram showing from the eye portion to the HMPE sheathed strand portion of a rope for trawl nets having a high-strength eye-splice according to a preferred embodiment of the present invention. FIG. 2 is a diagram showing the HMPE splice portion. FIG. 3 is a diagram showing the second fixing member provided at the boundary between the HMPE sheathed strand portion and basic rope portion. FIG. 4 is a diagram showing the HMPE sheathed strand portion. FIG. 5 is a diagram showing the first fixing member provided at the boundary between the eye portion and HMPE splice portion. FIG. 6 is a diagram showing the HMPE splice portion and HMPE sheathed strand portion. FIG. 7 is a diagram showing the eye portion, first fixing member and HMPE splice portion. FIG. 8 is a graph and a chart showing test results on the strength of a conventional rope for trawl nets. FIG. 9 is a graph and a chart showing test results on the strength of the rope for trawl nets having a high-strength eye-splice according to a preferred embodiment of the present invention. FIG. 10 is a photograph comparing the thickness of a conventional rope for trawl nets with that of the rope for trawl nets having high-strength eye-splice according to a preferred embodiment of the present invention. FIG. 11 is a diagram showing a rope having two second fixing members.

A rope for trawl nets having a high-strength eye-splice according to the preferred embodiment of the present invention comprises an eye portion (100), a first fixing member (200), an HMPE splice portion (300), an HMPE sheathed strand portion (400), a second fixing member (500), a basic rope portion (600) and a link.

The present invention relates to a rope that constitutes a troll net, which has a stronger strength and better wear resistance and a smaller volume and weight, as compared to a conventional rope that constitutes a troll net, thereby reducing oil use in running a ship during operation.

Hereinafter, the components of a rope for trawl nets having a high-strength eye-splice according to a preferred embodiment of the present invention will be described in detail with reference to FIGS. 1 to 6.

The eye portion (100) is made of an HMPE material and is tied round the end of the rope.

The eye portion (100) forms an eye with a rope made of an HMPE material woven in a blade manner by splice joint, and splice joint refers to forming a joint between two portions of a rope by partially decomposing and reassembling the strands of the rope by mixed spinning.

Four ropes may be coupled to a link by using the eye portion (100), four ropes may be coupled to the link to form a single mesh, and four ropes may be coupled to each of a plurality of links by using the eye portion (100) to form a trawl net.

The eye formed on the rope by splice joint may be coupled to a link, and the eyes formed on the four ropes may be coupled to a link to form one mesh.

That is, the eye formed by splice joint is provided at each of both ends of the trawl net having a high-strength eye-splice according to the present invention, and the eye at each end may be coupled to a link. A plurality of ropes are coupled to a plurality of links to make a plurality of meshes to form a trawl net.

The HMPE splice portion (300) is formed in a splice manner, and an eye portion (100) and an HMPE splice portion (300) may be formed on a rope in a winding manner of twisting the strands of the ends of the rope in the twisted direction of the rope or a weaving manner of pushing the strands in the direction opposite to the twisted direction of the rope.

The HMPE splice portion (300) is formed from the point of the splice to the point of the eye portion (100), and the point of the eye portion is the boundary between the HMPE splice portion (300) and the eye portion (100). The HMPE splice portion (300) decomposes one end of the rope made of an HMPE material and twists or weaves the strands from the point of the splice to the point of the eye portion in a winding or weaving manner.

The first fixing member (200) that prevents the eye portion (100) from unraveling may be placed on the boundary of the eye portion (100) and HMPE splice portion (300).

The first fixing member (200) is formed to be bent from a circle in the inner direction of the rope, which is the rope direction, to be in close contact with the rope, and a plurality of the bent portions (210) bent in the inner direction are formed at the same interval.

The first fixing member (200) in a circular ring shape is fitted to the rope, and then force is applied in the rope direction to form a plurality of bent portions (210) such that the first fixing member is in close contact with the rope and makes a closed curve as a whole.

Conventional fixed members of a rope have a method of fixing the rope by applying force in the rope direction at both ends of the ring shape that forms an open curve, not a closed curve, such that the pressed ends of the fixing member dig into the rope and damage the rope. When a trawl net is formed from such ropes and a certain tension is applied to the ropes in the course of expanding the trawl net, the ropes had a risk of being cut.

The first fixing member (200) of the present invention in a circular ring shape that forms a closed curve, rather than an open curve, is fitted to the rope and then uniformly pressed at the same interval, thereby minimizing the damage of the rope to greatly improve the breaking strength of the rope constituting the trawl net.

The HMPE sheathed strand portion (400) has a basic rope interpolated inside the HMPE rope, and strands of an HMPE material woven in a blade manner in the outer diameter of the basic rope. The basic rope is interpolated up to the point of the HMPE splice portion (300), and is formed from the point of the splice, which is the boundary between the HMPE sheathed strand portion (400) and the HMPE splice portion (300), to the HMPE sheathed strand portion (400).

The second fixing member (500) is fixed at the point of the HMPE sheathed strand portion (400), where the HMPE sheathed strand portion (400) begins, to prevent the strands of the HMPE material woven in a blade manner on the outside of the basic rope from unraveling and prevent the basic rope from leaving.

As shown in FIG. 11, at least one second fixing member may be provided, and at least one first fixing member may also be provided.

The second fixing member (500) bent from a circle in an inward direction, which is the rope direction, so as to be in close contact with the rope and comprises a plurality of bent portions bent in an inward direction at the same interval.

The second fixing member (500) in a circular ring shape is fitted to the rope, and then force is applied in the rope direction to form a plurality of bent portions such that the second fixing member is in close contact with the rope and makes a closed curve as a whole.

In addition, since the strands of an HMPE material are woven in a blade manner on the outer diameter of the basic rope, when force is applied to the eye portion forming the mesh of the net and tension is applied, the diameter of the strands of the HMPE material woven on the outer diameter of the basic rope is stretched and the interpolated basic rope is further tightened, thereby preventing the basic rope from leaving.

That is, when tension is applied to the HMPE sheathed strand portion (400), the length of the HMPE sheathed strands covering the outer diameter of the basic rope is lengthened by a predetermined length and the diameter is reduced to tighten the basic rope interpolated in the HMPE sheathed strands and strengthen the bond between the HMPE sheathed strand and basic rope, thereby preventing the trawl net from being broken due to the leaving of the basic rope even when a lot of force is applied to the trawl net.

In addition, the second fixing member (500) is also provided at the point of the HMPE sheath strand portion (400) such that the second fixing member may secondarily prevent the leaving of the basic rope and prevent the unraveling of the HMPE sheathed strands woven in a blade manner.

According to the present invention, the eye portion and splice portion of the rope constituting the trawl net where the most force is applied and a stress concentration phenomenon occurs when tension is applied to the rope may be made of an HMPE material having a high strength.

When the eye portion and splice portion are made of an HMPE material, the volume of the mesh portion of the trawl net is reduced and the resistance of the net is reduced to improve the efficiency of operation, and the rope becomes lighter in weight than a rope comprising a general PE material, thereby reducing the amount of oil consumed by a ship during operation using the trawl net.

Referring to FIG. 10, the rope for trawl nets having a high-strength eye-splice according to the present invention has an advantage in that it has a significantly smaller volume than a conventional rope for trawl nets and, thus, when a trawl net is formed and operation using the trawl net is performed, the resistance of the net may be reduced, and the weight of the rope is less than that of a conventional trawl net rope to increase the efficiency of operation using the trawl net.

A conventional rope for trawl nets and the rope for trawl nets having a high-strength eye-splice according to the present invention were tested to compare the strengths under the same conditions.

FIG. 8 is a graph and chart of the test on the strength of a conventionally used rope for trawl nets, which show that the conventional rope for trawl nets has a maximum load of 1556.6 kgf and a tensile strength of 155659.99 kgf/cm$^2$.

FIG. 9 is a graph and chart of the test on the strength of a rope for trawl nets having a high-strength eye-splice according to the present invention, which show that the rope for trawl nets according to the present invention has a maximum load of 1708.2 kgf and a tensile strength of 170819.99 kgf/cm$^2$.

Referring to FIGS. 8 to 9, it is confirmed that the rope for trawl nets having a high-strength eye-splice according to the present invention has a smaller volume and weight and a stronger strength than a conventional rope for trawl nets.

The above-identified description is merely an example of the technical idea of the present invention, and a person skilled in the art may make various modifications, changes and substitutions thereto, without departing from the essential characteristics of the present invention. Therefore, the embodiments disclosed in the detailed description of the present invention and drawings as attached are intended to explain the technical idea of the present invention, rather than limiting same, and the scope of the technical idea of the present invention is not limited to the embodiments and attached drawings. The scope of the present invention for which protection is sought should be construed according to the claims below, and all technical ideas within the equivalent range should be construed as falling within the scope of the present invention.

DESCRIPTION OF NUMERALS

100: An eye portion
200: A first fixing member
300: An HMPE splice portion
400: An HMPE sheathed strand portion
500: A second fixing member
600: A basic rope portion

The invention claimed is:

1. A rope for trawl nets having a high-strength eye-splice, comprising:
   a first section including an eye portion and a high-modulus polyethylene (HMPE) splice portion, wherein
      the eye portion is made only of a high-modulus polyethylene (HMPE) material and formed at one side of the first section of the rope; and
      the HMPE splice portion is made of the HMPE material and formed in a splice manner at the other side of the first section to form the eye portion;
   a first fixing member having a circular ring shape surrounding the rope and placed on a boundary of the eye portion and the HMPE splice portion to prevent the eye portion from unraveling;
   a second section including an HMPE sheathed strand portion and a first portion of a basic rope, wherein
      the HMPE sheathed strand portion sheaths a circumference of the first portion of the basic rope,
      the basic rope is made of a general polyethylene (PE) material, and
      the HMPE sheathed strand portion is made of the HMPE material which is extended from the first section of the rope;
   a third section including only a second portion of the basic rope; and
   a second fixing member placed at an end portion of the second section close to the third section to prevent strands of the HMPE material from unraveling and to prevent the first portion of the basic rope from leaving from the HMPE sheathed strand portion.

2. The rope for trawl nets having a high-strength eye-splice of claim 1, wherein the first fixing member is bent from a circle in an inward direction, which is the rope direction, to be in close contact with the HMPE splice portion, and comprises a plurality of bent portions bent in an inward direction at the same interval.

3. The rope for trawl nets having a high-strength eye-splice of claim 1, wherein the second fixing member is bent from a circle in an inward direction, which is the rope direction, to be in close contact with the HMPE sheathed strand portion, and comprises a plurality of bent portions bent in an inward direction at the same interval.

* * * * *